US006638190B2

(12) United States Patent
Patterson et al.

(10) Patent No.: US 6,638,190 B2
(45) Date of Patent: Oct. 28, 2003

(54) COMPACT HYDRAULICALLY-OPERATED DERAILLEUR SHIFTING SYSTEM FOR BICYCLES

(76) Inventors: Richard A. Patterson, 210 Liz La., Georgetown, TX (US) 78628; Roy M. Patterson, 12302 Cabana La., Austin, TX (US) 78727

( * ) Notice: Subject to any disclaimer, the term of this patent is extended or adjusted under 35 U.S.C. 154(b) by 128 days.

(21) Appl. No.: 10/054,107

(22) Filed: Nov. 13, 2001

(65) Prior Publication Data

US 2002/0058558 A1 May 16, 2002

Related U.S. Application Data

(63) Continuation-in-part of application No. 09/519,200, filed on Mar. 6, 2000, now Pat. No. 6,325,733, which is a continuation of application No. 09/137,219, filed on Aug. 20, 1998, now Pat. No. 6,042,495, which is a continuation-in-part of application No. 08/997,973, filed on Dec. 24, 1997, now Pat. No. 6,012,999.

(51) Int. Cl.[7] .............................. F16H 9/24; B62M 9/12
(52) U.S. Cl. ........................................... 474/82; 474/78
(58) Field of Search ..................... 474/78, 80, 81, 474/82, 110

(56) References Cited

U.S. PATENT DOCUMENTS 3,181,383 A * 5/1965 Juy .................. 474/82
3,742,777 A * 7/1973 Mathauser ............. 474/110 X
RE30,524 E * 2/1981 Nagano ................. 474/82
4,500,302 A * 2/1985 Crepin ................. 474/82
5,302,155 A * 4/1994 Ishibashi .............. 474/82
5,624,335 A * 4/1997 Ando ................... 474/80
5,890,979 A * 4/1999 Wendler ................ 474/82
6,159,119 A * 12/2000 Nakamura et al. ....... 474/80

* cited by examiner

*Primary Examiner*—David A. Bucco
*Assistant Examiner*—Colby Hansen
(74) *Attorney, Agent, or Firm*—Jack V. Musgrove

(57) ABSTRACT

A derailleur utilizes a 4-bar linkage, including a housing which acts as one bar of the 4-bar linkage. A hydraulic assembly located within the housing moves the housing relative to the mounting shaft in response to hydraulic pressure to define a chain guide operating path. The derailleur device may include a detent mechanism formed on one of the three other bars. In one embodiment, the 4-bar linkage includes an input shaft rotatably attached to the housing at a one end, and an output shaft rotatably attached to the housing at the other end, and the housing rotates around the first shaft in response to the actuation force. The hydraulic assembly may include a piston which moves within a cylindrical bore, with one of the three other bars of the 4-bar linkage being attached to the piston. The resulting hydraulic derailleur design is comparable to mechanical (cable-pull type) derailleurs in size and weight.

17 Claims, 2 Drawing Sheets

COMPACT HYDRAULICALLY-OPERATED DERAILLEUR SHIFTING SYSTEM FOR BICYCLES

CROSS-REFERENCE TO RELATED APPLICATIONS

This application is a continuation-in-part of copending U.S. patent application Ser. No. 09/519,200 filed on Mar. 6, 2000, now U.S. Pat. No. 6,325,733 which is a continuation of U.S. patent application Ser. No. 09/137,219 filed on Aug. 20, 1998, now U.S. Pat. No. 6,042,495, which is a continuation-in-part of U.S. patent application Ser. No. 08/997,973 filed Dec. 24, 1997, now U.S. Pat. No. 6,012,999.

BACKGROUND OF THE INVENTION

1. Field of the Invention

The present invention generally relates to bicycles, and more specifically to hydraulically-operated control systems for bicycles, particularly shifting systems for bicycles which use a derailleur or similar chain guide to control the position of the drive chain.

2. Description of the Related Art

Typical bicycles can be operated in multiple gears by adjusting a drive chain between a cluster of larger diameter sprockets on the pedal crankshaft and a sprocket cassette mounted on the rear wheel axle. A device known as a derailleur is used to position the drive chain on a given sprocket. Existing mechanical derailleur shifting systems usually incorporate four-bar linkage mechanisms that are controlled by tension cables. A rear derailleur is located on the lower slack side of the drive chain at the rear wheel, and a front derailleur is located on the upper tight side of the chain at the sprocket cluster attached to the pedal crankshaft. The shifting control mechanism for mechanical derailleurs can be mounted on the front down tube of the bicycle frame, but most commonly is mounted on the bicycle handle bars. The shifting control mechanism typically has a small diameter detented or ratcheted pulley around which the derailleur control cable is wrapped. Each derailleur is controlled by its own shifting control mechanism.

So-called "mountain" bicycles (designed for off-road use) have become increasingly popular over the past several years, and cyclists are riding these bikes in more harsh environments. Many new innovations have been incorporated into these bicycles to increase their comfort, control, and durability. Elastomeric, air, and hydraulic suspension systems have been added to both the front and rear of mountain bicycles. New hydraulic wheel and disc braking systems have also been introduced. Unfortunately, the front and rear chain shifting systems have remained essentially unchanged; and still use mechanical cables to control the chain guiding mechanisms.

These derailleurs provide satisfactory performance in relatively clean and dry operating environments like those experienced by road bicycles. However, when mountain bikes are used in the dusty, wet, and muddy conditions found on rugged and primitive roads and trails, various contaminants work their way into the derailleur's pivots and open linkages as well as into and under tension control cables. Such contamination makes the derailleurs difficult to shift, adversely affects their precision in shifting, and also makes them wear out very quickly. The cyclist is thus required to clean, lubricate, adjust and replace mountain bike derailleur components much more frequently. Under extremely harsh operating conditions, existing mechanical derailleurs will fail, making it impossible for the cyclist to change drive ratios.

Products are available which attempt to protect the current design of derailleurs from harsh mountain biking environments. Rubber covers or boots provide some protection for the parallel linkages on the front and rear derailleur mechanisms, but these covers are not waterproof, and mud and water can still enter the mechanisms. New styles of specially coated derailleur control cables are also being offered which are designed to be less affected by mud, water, and dirt. However, dirt can still enter these control cables and cause the cables to stick or bind inside their flexible guide housings.

Alternative derailleur designs exist which do not require tension cables, such as hydraulically-actuated shifting (chain guide) systems. For example, in the design described in U.S. Pat. No. 3,742,777, conventional derailleurs are positioned using sealed actuating bellows which extend within the front or rear derailleur under the influence of hydraulic pressure generated within similar control bellows located in handle bar controller units.

While hydraulic shifting designs may avoid some problems associated with contamination of tension cables and related components, they present several other problems. One significant impediment to the successful commercialization of hydraulic derailleur systems is their size. A hydraulic derailleur that is too large will be more likely to catch on objects (e.g., tree limbs) as the cycle is ridden, and also makes transportation and stowage more difficult (ground and side clearance). The cyclists' feet might furthermore get caught in a bulky derailleur. Previous hydraulic shifting systems designs are generally larger in size than their mechanical counter parts. This additional size could make these derailleurs more difficult to mount on the bicycle frame as well. Additionally, the larger handle bar mounted actuator units could interfere with the cyclists gripping points on the handle bars, or even reduce knee clearance.

Similarly, the weight of a derailleur system is of great concern to bicycling enthusiasts. Systems which add considerable weight over a cable-tension shifting system will make it more difficult for the cyclist to pedal, particularly uphill. Prior art hydraulic shifting systems designs are again generally heavier than their mechanical pull-cable operated counterparts. In competitive events such as mountain bike races, additional weight on the bicycle frame from heavy shifting components can mean the difference between winning or losing a race.

In light of the foregoing, it would be desirable to devise an improved hydraulic shifting system which avoids the problems associated with mechanical (e.g., cable-pull type) derailleur control devices, and further provides precise and simple operation. It would be further advantageous if the improved hydraulic shifting system could be constructed in a more compact and lightweight design.

SUMMARY OF THE INVENTION

It is therefore one object of the present invention to provide an improved hydraulic shifting system for bicycles.

It is another object of the present invention to provide such a hydraulic shifting system that provides precise and simple control in a compact design.

It is yet another object of the present invention to provide such a hydraulic shifting system that is relatively lightweight.

The foregoing objects are achieved in a derailleur device generally comprising a 4-bar linkage, including a housing which acts as one bar of the 4-bar linkage, and three other bars which are located within the housing, as well as means for mounting the housing to a bicycle frame proximate a sprocket cassette and means, located within the housing, for moving the housing relative to the mounting means in response to an actuation force to thereby define a chain guide operating path. The derailleur device may include a detent mechanism formed at least in part on one of the three other bars. In one embodiment, the housing is elongate, and the 4-bar linkage includes a first shaft rotatably attached to the housing at a first end, and a second shaft rotatably attached to the housing at a second end, and the housing rotates around the first shaft in response to the actuation force. The invention is especially directed to a hydraulic implementation wherein the moving means includes a hydraulic assembly which responds to hydraulic pressure exerted by the actuation force. The hydraulic assembly may include a piston which moves within a cylindrical bore, with one of the three other bars of the 4-bar linkage being attached to the piston. The resulting hydraulic derailleur design is comparable to mechanical (cable-pull) derailleurs in size and weight.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
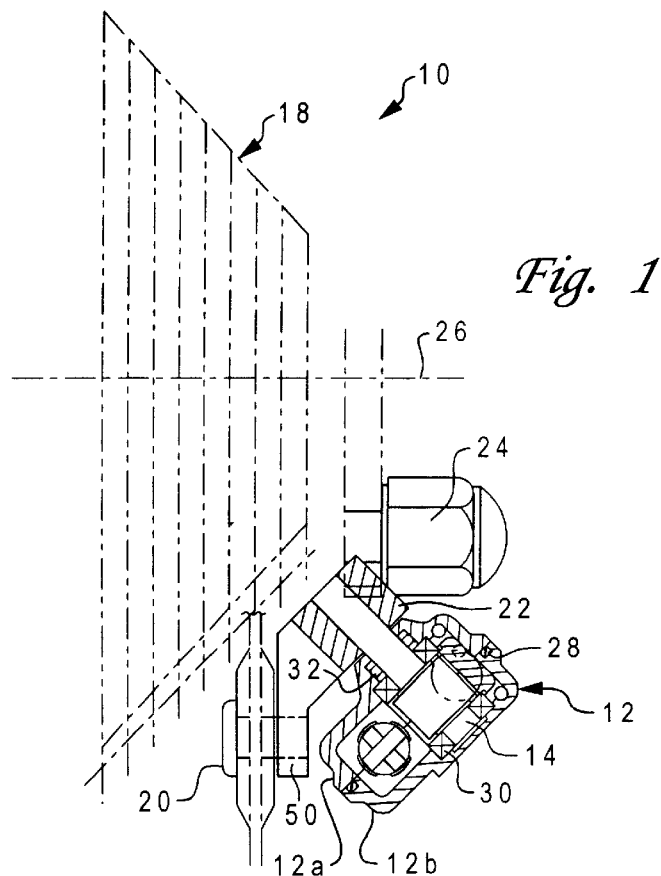
FIG. 1 is a rear elevational view of one embodiment of a compact hydraulic derailleur system, shown mounted on the rear sprocket cassette of a bicycle.

The present invention is directed to a compact, hydraulically-operated rear derailleur shifting system for mountain, road and tandem bicycles. The shifting systems described herein are improvements over the designs disclosed in U.S. Pat. Nos. 6,325,733, 6,042,495 and 6,012,999, each of which is hereby incorporated.

The hydraulic shifting systems described in foregoing patents have a number of advantages over cable-operated mechanical shifting systems, especially when these systems are operated in harsh conditions. These conditions could occur on wet, muddy, dusty, or sandy environments and trials that are likely to be experienced where mountain bikes are commonly used. Mud, sand, water, and dust/dirt are especially harmful to the small exposed mechanisms in existing cable operated shifting systems. Equally vulnerable to these conditions is the exposed, unsealed mechanical pull cable that conveys shifting signals from the mechanical handle bar mounted controller devices to the front and rear mechanical derailleurs. These cables pass through and around small tubes and guides that easily become packed with mud, sand, and dirt, and prevent the cables from moving freely. Unless the control cables can move freely, the cable operated derailleurs are unable to accurately transfer and position the moving chain for effective shifting.

The hydraulic shifting systems described in foregoing patents contain the following advantages, among others, over existing cable operated mechanical shift systems. First, hydraulic shifting systems contain no mechanical pull cables that can stretch, wear, or stick in their guide tubes. Transfer of the cyclist's shifting signals instead occurs by conveying pressurized hydraulic fluid through sealed hydraulic lines from the actuator to the derailleur. In hydraulic shifting systems, the major system operating components (including the hydraulic components in the actuators and derailleurs along with the detent locating means in the derailleur) are all sealed from contamination by water, mud, sand, etc. The critical components that determine the final stopping or shifting positions in existing mechanical derailleurs are not sealed, and are easily contaminated by mud, water, sand etc. These contaminants quickly degrade the performance of existing mechanical derailleurs, which require frequent cleaning to maintain acceptable performance. Furthermore, in hydraulic shifting systems, the detent locating means for accurately positioning the chain guiding portions of the derailleurs are located in the derailleur, and not in the actuator device. In existing mechanical cable operated derailleurs, the locating means for positioning the chain guides are part of the actuator. Thus, the final stopping position of the derailleur is highly dependent on the amount of stretch, wear, and stickiness in the mechanical pull cable between the actuator and derailleur. Finally, mechanical shifting systems have the ability to sweep or pass through several sprocket ratios in a single movement of one of the shifting levers. However, it is necessary to move the other shifting lever on the actuator one time for every shift in the opposite direction. Hydraulic shifting systems possess the ability to sweep through multiple sprocket ratios with a single movement of the shifting lever in both directions, thus reducing fatigue on the cyclist.

While the hydraulic shifting systems previously described are accordingly superior in many respects as compared to mechanical systems, they could still use improvement with regard to size and weight. Cycling enthusiasts today are interested in bicycles that have compact, light-weight frames, wheels, handle bars, as well as braking and shifting controls. A wide range of bicycle products are available that have been designed to reduce the bike's overall weight, and thus enable the cyclist to perform better in training or competition. Thus, for a new hydraulic shifting system to be viable in the marketplace, it is preferably equivalent in weight to currently available mechanical cable operated systems. The present invention address these market acceptance requirements by providing a novel compact, lighter-weight, rear hydraulically-operated derailleur. The invention still possesses the desirable features of previous hydraulic shifters, and at the same time can be comparable in weight and size to existing mechanical (cable-operated) derailleurs.

Before detailing the present invention, however, it is useful to review the elements incorporated from the previous hydraulically operated shifting system designs. A pivoted mounting bracket is used for attaching the rear derailleur assembly to a standard threaded mounting point, called the "drop out lug," that is positioned slightly behind and below the rear wheel axle on the chain drive side of the bike. A sealed structural derailleur housing contains a linear hydraulic piston/cylinder device, a detented positioning and locating device, and an output shaft that exists the housing through a water-proof seal. One side of the housing attaches to the pivoted mounting bracket. The linear hydraulic piston/ cylinder contains a piston rod that exits the end of the hydraulic cylinder through a sliding seal. The other end of the cylinder is sealed. Hydraulic pressure is ported to both ends of the cylinder on opposite sides of the piston. When pressure is provided on the rod end of the piston, the piston moves toward the tail end of the cylinder, causing the piston rod to retract inside the cylinder. When pressure is provided on the tail end of the cylinder (opposite end from the piston rod end) the piston is driven toward the rod end, and the piston rod is caused to extend out of the cylinder. The piston rod is attached through a clevis and pivot pin to the end of a lever. The other end of the lever is clamped to the output shaft that exits the derailleur housing. Thus, as the piston rod extends and retracts, the output shaft is caused to rotate.

The detented radial positioning device also operates on the same output shaft as the hydraulic cylinder. The detent device consists of a disc containing closely space notches or grooves on its perimeter. This disc operates in close proximity to a guide block that contains a spring loaded plunger. The one end of the plunger contains a beveled end. The opposite end of the plunger is retained in a close fitting bore in the block, and is spring biased outward from the block. The angle between the faces of the beveled plunger end is the same as the angle between the faces of the notches in the perimeter of the disc. As the disc is rotated by the output shaft of the derailleur, the tapered notches in the disc become aligned with the beveled end of the detent plunger. This movement allows the plunger to drop into one of the notches in the disc. As the disc is rotated by the torque generated by the hydraulic cylinder and its actuating lever, the detent drops into or is forced out of successive notches in the disc.

In the previous designs, two links of equal length are used to couple the output shaft to a pivot block. The first link clamps onto the output shaft where it exits from the derailleur housing through a waterproof seal. The output shaft is rotated by the hydraulic cylinder, and positioned in specific rotational stopping positions by the detent disc. The other end of the first link contains a through hole to receive a pivot pin. The second link contains through holes at both ends for pivot pins. One end of the second link is mounted through a pivot pin to the derailleur housing. The pivot pin for the second link is adjacent to and parallel to the housing output shaft where it exits the housing. The pivot block contains parallel pin holes on one side for mounting the pivot pin ends of the first and second links on the ends opposite the structural housing of the derailleur. The spacing between the parallel pin holes in the mounting block is the same as the output shaft and pivot pin spacing in the structural housing. The configuration (including the sealed structural housing with the two external parallel length links, and the pivot block) comprise a mechanical construct known as a 4-bar linkage. An upper chain guide sprocket is then attached for rotation to a side of the pivot block away from the 4-bar linkage. A slack chain take-up lever has an upper pivot shaft close to and parallel with the shaft for upper chain guide sprocket shaft. The lower end of the take-up lever contains a second idler sprocket mounted for free rotation to the lower end of the lever. A return spring is also provided on the slack take up lever that tends to cause it to rotate toward the rear of the bike when mounted.

With reference now to the figures, and in particular with reference to FIG. 1, there is depicted one embodiment 10 of a compact hydraulic rear derailleur system constructed in accordance with the present invention. FIG. 1 illustrates compact hydraulic rear derailleur system 10 from a rear perspective, that is, looking from behind the bicycle toward the front of the bicycle. Derailleur system 10 is generally comprised of a derailleur body 12 which houses a hydraulic assembly that includes two shafts 14 and 16. As described in further detail below, shaft 14 is attached to the bicycle frame at the sprocket cassette 18, and shaft 16 is attached to a guide sprocket 20 that is part of a chain guide and idler assembly. The compact rear derailleur design preferably utilizes the same chain guiding and slack take-up idler assembly as the previously incorporated designs. The path through which this idler assembly is moved by the derailleur mechanism is also identical with the previous designs.

Like the previous derailleur designs, compact derailleur system 10 utilizes a 4-bar linkage to create the operating path for the idler assembly. However, in the compact design, the 4-bar linkage mechanism is integrated with the structural housing 12 (in the previous designs, the 4-bar linkage mechanism was external to the housing which contained the hydraulically-actuated piston). This change significantly reduces the overall size of the compact rear derailleur 10, to be approximately equal in length to conventional mechanical (e.g., cable-pull type) derailleurs.

The function of the 4-bar linkage in previous hydraulic rear derailleurs was to constrain the motion of the chain guiding and idler assembly to a segment of a circular arc under the sprocket cassette that drives the rear bicycle wheel. In addition, the 4-bar linkage restrained the motion of the idler sprocket assembly in such a way that, as the idler assembly moves through its arc path, the axes of rotation of the idler sprockets are always parallel to the axle of the rear wheel. In these previous designs, the 4-bar linkage is external to the main derailleur structural housing (see, e.g., FIG. 12C of U.S. Pat. No. 6,042,495). The overall length of the previous hydraulic derailleurs approximately equals the sum of lengths of each of the major elements in the derailleur since these elements are generally mounted end-to-end in the derailleur. These elements include the pivoted mounting bracket, the structural housing, the external 4-bar linkage, and the pivoted block and idler sprocket assembly. Unfortunately, this length is significantly larger than the overall length of cable-operated mechanical derailleurs. Because previous hydraulic derailleurs are larger in overall size than comparable mechanical pull cable systems, they can also be significantly heavier.

The present invention achieves the reduction in length by integrating the housing for the hydraulic components with the 4-bar linkage, and by allowing the derailleur housing itself to move (rotate) with respect to the sprocket cassette. Derailleur body 12 rotates about shaft 14, as explained below. Derailleur body 12 may be attached to the bicycle frame using a first pivoted mounting block 22 that is mounted to the bicycle frame using the drop out lug 24. Shaft 14 is affixed (releasably) to a portion of first pivoted mounting block 22. First pivoted mounting block 22 is located behind and slightly below the level of the rear wheel axle 26. Pivot block 22 pivots about the axis of dropout lug 24, and allows derailleur body 12 to swing through small angles to compensate for motion of the slack chain take-up lever.

The main body 12 of derailleur system 10, in which the 4-bar linkage and sealed structural housing of previous designs are integrated into a single mechanism, is preferably constructed of a two-piece outer housing that is pinned and screwed together. An O-ring seal 28 extends around the perimeter of the seam between the two housing halves 12*a*, 12*b* to prevent hydraulic fluid from leaking out between the housing halves. Shaft 14 (the input shaft) is supported on ball bearings 30 inside a first end of the housing halves. Another O-ring seal 32 is provided around input shaft 14 where it exits housing 12*a*. The end of the input shaft 14 exiting the derailleur housing is clamped in pivoted mounting block 22. The angular orientation of input shaft 14 with respect to block 22 can be adjusted slightly. When clamped in position, input shaft 14 is located slightly behind and below rear wheel axle 26, and is inclined at a 45° angle with respect to the rear wheel axle when viewed from the rear of the bicycle as in FIG. 1.

Figure 2:
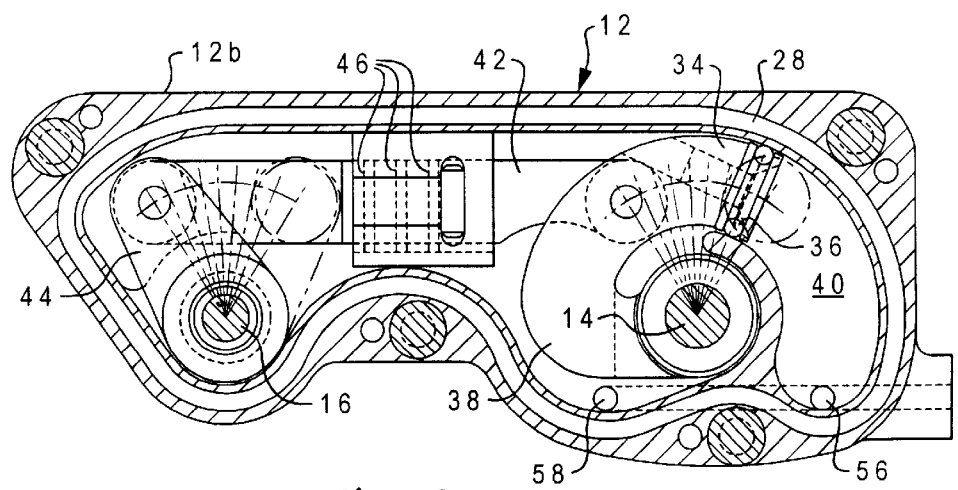
FIG. 2 is a longitudinal section of the derailleur body used in the derailleur system of FIG. 1, depicting the 4-bar linkage which includes the derailleur body.

As further seen in the longitudinal section view of FIG. 2, a curved hydraulic cylinder 34 is located at the same end of housing 12 as input shaft 14. Curved hydraulic cylinder 34 (a torus section) is provided with a single O-ring seal piston 36 at its head. Piston 36 is mounted to a curved lever 38 that is attached to input shaft 14. As the input shaft rotates, piston 36 traverses the curved cylindrical (circular cross-section) region 40, and creates a moving seal inside the cylinder bore. Thus, if hydraulic pressure is applied to either side of piston 36, the pressure moves the piston, which would tend to rotate input shaft 14. However, since input shaft 14 is affixed to its mounting block 22 it is prevented from rotating, and the torque created by the pressure against piston 36 instead causes the entire derailleur body 12 to rotate around input shaft 14 since body 12 is not otherwise constrained.

Other hydraulic transducers could also be used inside the derailleur housing to generate the necessary torque. Another style of rotary force transducer is a "rotary vane" system. It would also be possible to utilize a linear hydraulic cylinder similar to the type used in previous hydraulic derailleur designs. However, the curved cylinder construction is deemed preferable due to its simplicity in sealing, and its smaller overall size.

Piston 36 is also coupled to an elongated connecting link 42 that contains pivot pin holes at each end. One pivot pin connects link 42 to the piston on the input shaft end, while the other pivot pin connects link 42 to a second lever 44 that is affixed to shaft 16 (the output shaft). Connecting link 42 also contains a series of equal-depth, closely-spaced, parallel grooves 46 on opposite flat side surfaces, which are part of the detent mechanism described further below. Output shaft 16 is supported by ball bearings in the housing halves. Output shaft 16 is located at the opposite end of housing 12 with respect to input shaft 14. The axes of input shaft 14 and output shaft 16 are generally parallel. Output shaft 16 exits the housing through another rotational O-ring seal. Thus, a 4-bar linkage is formed with the 4 bars being comprised of the two levers 38, 44, connecting link 42, and body 12. Alternative means (non-hydraulic) could be provided for coupling the necessary force to rotate derailleur body 12, e.g., tension cables.

The end of output shaft 16 which exits from body 12 is clamped onto a second mounting block 50. The guide and idler sprocket assembly (as described for previous hydraulic derailleur designs) is mounted to second block 50. When actuated, derailleur body 12 moves the chain guiding idler assembly through a segment of an arc that is inclined at a 45° angle to the rear wheel axle. Actuation of hydraulic pressure at piston 36 also causes relative rotation of output shaft 16 as body 12 rotates about input shaft 14. An adjustment mechanism can be provided to slightly change the rotational clamping position of output shaft 16 with respect to block 50 during installation of the derailleur onto the bike.

While the dimensions of the derailleur may vary considerably depending upon the application, the following dimensions are considered exemplary. The distance between the centerpoints of the shafts 14 and 16 is about 1.875", and the overall length of housing 12 is about 3". The height of the derailleur is about 1.25". The weight of the derailleur will depend upon the materials used. To keep the weight low, housing 12 is preferably constructed of magnesium, and the linkages are constructed of titanium. The weight of the overall system is comparable to mechanical-type derailleurs.

Figure 3:
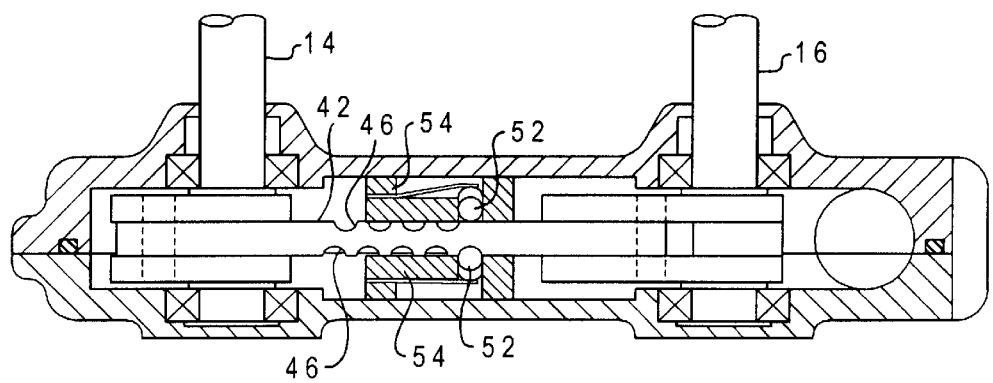
FIG. 3 is a side section of the derailleur body used in the derailleur system of FIG. 1, illustrating a detent mechanism.

Compact hydraulic rear derailleur system 10 may be provided with various additional features to refine its operation. For example, a detent mechanism may be built into derailleur 10 to provide precise shifting between different gears on the sprocket cassette. The detent mechanism may utilize dual spring-loaded rollers that operate in conjunction with the grooves 46 in opposite sides of connecting link 42. As shown in FIG. 3, when the connecting link moves with the levers, grooves 46 pass in front of the spring-loaded rollers 52 that are held in the slots in the detent block 54, and that can move in and out relative to connecting link 42. Rollers 52 are spring biased toward the link surfaces and toward one another. When a groove 46 in connecting link 42 passes before a roller position in detent block 54, the bias spring forces the roller out into the groove, and the link is accurately positioned. The connecting link will be held in its position as long as the forces applied to the link that are less than the force required to push the detent roller back into its slot against the spring bias. The array of grooves in each face of the link is approximately equally spaced between the pivot pin holes, and the location of the grooves are staggered so that where there is a groove in the front face, there is no groove in the back face of the link directly behind the front face. An adjustment mechanism (e.g., a sealed lead screw) may be provided for positioning the detent mechanism (e.g., block 54) within the sealed housing to enable precise setting of the stopping positions of the derailleur mechanism once installed on the bike.

For a derailleur operating with an 8-speed rear cassette, the connecting link would contain 8 grooves (4 on each side of the link, and staggered with respect to one another). These groove locations would correspond to the desired stopping positions for the upper idler sprocket with respect to 8 slightly different diameter sprockets in the rear cassette. For a derailleur operating with a 9-speed rear cassette, the connecting link would contain 9 grooves (5 on one side and 4 on the other side of the link, and staggered with respect to one another).

Hydraulic pressure may be selectively applied to either of the two sides of piston 36 by providing two hydraulic ports 56, 58 in one of the housing halves. Port 56 supplies hydraulic fluid to the closed end portion of the curved cylindrical bore, while port 58 supplies hydraulic fluid to the open end portion of the curved cylindrical bore (in the depicted embodiment, the open end portion includes the entire internal chamber of the sealed housing halves).

Figure 4:
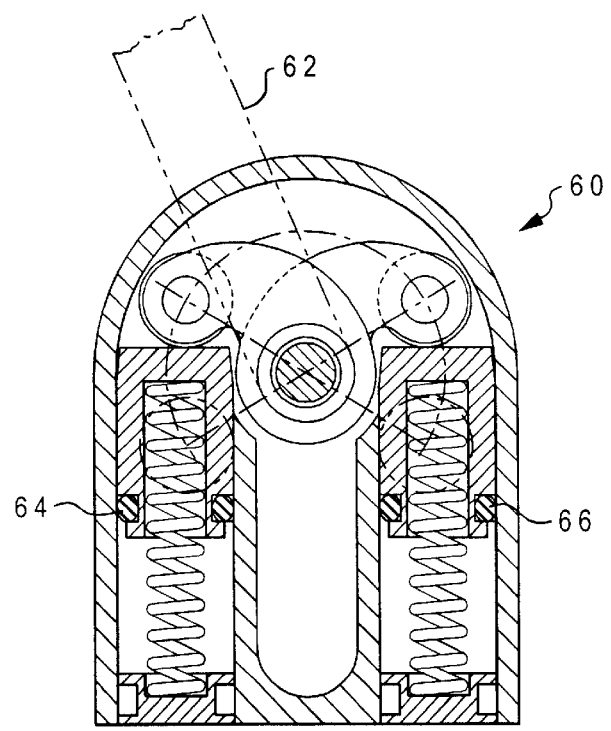
FIG. 4 is an elevational section of a handle-bar mounted actuator which can be used to provide hydraulic pressure to the derailleur system of FIG. 1.

Referring now to FIG. 4, in the exemplary implementation compact hydraulic rear derailleur system 10 is in fluid communication with a handle-bar actuator 60 (located, for example, on the right handle bar of the bicycle). A pair of small-diameter hydraulic tubes connect two reservoirs within actuator 60 to the ports 56, 58, respectively. When the cyclist moves a finger (thumb) control lever 62 on actuator 60 in a first direction, a first piston 64 is caused to move within a hydraulic cylinder of the actuator, and hydraulic fluid in the actuator cylinder ahead of piston 64 is displaced toward the derailleur through the first hydraulic line connected to port 56. When the pressurized hydraulic fluid from the actuator enters the closed end of the curved hydraulic cylinder, it creates a force to move the piston in the curved cylinder bore toward the open or housing end of the cylinder.

When the cyclist moves control lever 62 in a second direction, a second piston 66 is caused to move within another hydraulic cylinder of the actuator, and hydraulic fluid in the actuator cylinder ahead of piston 66 is displaced toward the derailleur through the second hydraulic line connected to port 58. When the pressurized hydraulic fluid from the actuator enters the open or housing end of the curved hydraulic cylinder, it creates a force to move the piston in the curved cylinder bore toward the closed end of the cylinder.

As previously explained, the piston that operates in the closed bore in the curved cylinder is attached to a curved lever that is in turn attached to the input shaft of the derailleur. The input shaft is clamped to the pivoted mounting block that is attached to the drop out bracket on the bike frame. The input shaft of the derailleur is thereby prevented from rotating. When hydraulic forces are generated between the piston and housing of the derailleur, the piston remains stationary with respect to the pivoted mounting block, and the derailleur housing rotates about the axis of the input shaft on its supporting ball bearings. Rotation of the housing about its input shaft causes the opposite end of the derailleur housing and the output shaft to swing through a segment of an arc. As the output shaft is driven through a segment of an arc by the moving derailleur housing, it is also caused to rotate in the opposite direction and same angular speed as the housing by the connecting link and the two equal-length levers on the input and output shafts.

When derailleur housing 12 rotates about input shaft 14, the chain guide mechanism also moves through the same arc segment as the output shaft. However, the connecting link and equal-length levers on the input and output shafts cause the chain guiding mechanism to rotate in the opposite direction and at same angular speed as the housing. Thus, as the derailleur moves through its arc segment under the rear sprocket cassette, the chain guiding assembly is also allowed to move into and out of alignment with each of the sprockets in the rear cassette. During this motion, the connecting link and equal length levers inside the derailleur housing cause the centerlines of the upper and lower idler sprockets on the chain guiding assembly to remain parallel to the axle of the rear wheel. The slack side of the moving bicycle chain, as it moves around the idler and guiding sprockets on the derailleur, can therefore be transferred between adjacent different diameter sprockets by the cyclist moving the control levers on the handle bar actuator 60.

A bypass port and valve can be used to fill the derailleur housing on both sides of the hydraulic piston with hydraulic fluid, and expel all air bubbles from inside the housing. The bypass port and valve would preferably be provided in the derailleur housing at a location corresponding to the top of the fluid level in the derailleur housing, and bypassing the piston between the open and closed ends of the curved hydraulic cylinder. When the actuator/derailleur system was being filled and primed, the bypass valve in the derailleur could be opened, and the finger lever of the actuator would be moved repeatedly, causing hydraulic fluid to be pumped from the actuator to the derailleur and back to the actuator. This process continues until no more air bubbles are observed in the return line and reservoir of the actuator. The bypass valve in the actuator is then closed, and the shifting system is ready for use.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the novel hydraulic derailleur system designs disclosed herein are particularly useful with mountain bicycles, they also have characteristics that are desirable for road bicycles. Although the illustrative description covers only the rear derailleur, the features, basic principles of operation, and structure for the hydraulically-operated rear derailleur could also be applied to the design of a compact front chain guide. It is therefore contemplated that these and other modifications can be made without departing from the spirit or scope of the present invention as defined in the appended claims.

What is claimed is:

1. A derailleur device comprising:
   a 4-bar linkage, including a housing which acts as one bar of said 4-bar linkage, and three other bars which are located within said housing;
   means for mounting said housing to a bicycle frame proximate a sprocket cassette; and
   means, located within said housing, for moving said housing relative to said mounting means in response to an actuation force to thereby define a chain guide operating path.

2. The derailleur device of claim 1 further comprising a detent mechanism formed at least in part on one of said three other bars.

3. The derailleur device of claim 1 further comprising a chain guide which moves along the chain guide operating path when said housing moves relative to said mounting means.

4. The derailleur device of claim 1 wherein said mounting means attaches a pivot point of said 4-bar linkage to the bicycle frame.

5. The derailleur device of claim 4 wherein:
   said housing is elongate;
   said 4-bar linkage includes
      a first shaft rotatably attached to said housing, said first shaft providing said pivot point and being located at a first end of said housing, and
      a second shaft rotatably attached to said housing, said second shaft providing a second pivot point of said 4-bar linkage and being located at a second end of said housing; and
   said housing rotates around said first shaft in response to the actuation force.

6. The derailleur device of claim 5 wherein said mounting means includes a mounting block which is affixed to said first shaft.

7. The derailleur device of claim 1 wherein said moving means includes a hydraulic assembly which responds to hydraulic pressure exerted by the actuation force.

8. The derailleur device of claim 7 further comprising a hydraulic actuator coupled to said moving means.

9. The derailleur device of claim 7 wherein:
   said hydraulic assembly includes a piston which moves within a cylindrical bore; and
   one of said three other bars of said 4-bar linkage is attached to said piston.

10. The derailleur device of claim 9 wherein:
    said housing is elongate;
    said 4-bar linkage includes
       a first shaft rotatably attached to said housing at a first end thereof, and a second shaft rotatably attached to said housing at a second end thereof; and said piston is coupled to said first shaft such that said housing rotates around said first shaft in response to the hydraulic pressure.

11. A hydraulic derailleur device comprising:

a housing wherein said housing acts as one bar of a 4-bar linkage, and three other bars of said 4-bar linkage are located within said housing;

a mounting block for attaching said housing to a bicycle frame proximate a sprocket cassette; and a hydraulic assembly located within said housing for moving said housing relative to said mounting block in response to hydraulic pressure to thereby define a chain guide operating path.

12. The hydraulic derailleur device of claim 11 further comprising a chain guide which moves along the chain guide operating path when said housing moves relative to said mounting block.

13. The hydraulic derailleur device of claim 11 further comprising a hydraulic actuator coupled to said hydraulic assembly.

14. The hydraulic derailleur device of claim 11 further comprising a detent mechanism formed at least in part on one of said three other bars.

15. The hydraulic derailleur device of claim 11 wherein:

said hydraulic assembly includes a piston which moves within a cylindrical bore; and one of said three other bars of said 4-bar linkage is attached to said piston.

16. The hydraulic derailleur device of claim 15 wherein:

said housing is elongate;

said 4-bar linkage includes a first shaft rotatably attached to said housing at a first end thereof, and a second shaft rotatably attached to said housing at a second end thereof; and said piston is coupled to said first shaft such that said housing rotates around said first shaft in response to the hydraulic pressure.

17. A system for shifting between different drive ratios on a bicycle, comprising:

a hydraulic actuator;

an elongate derailleur housing having a mounting shaft at a first end, and a hydraulic assembly which moves said derailleur housing relative to said mounting shaft in response to hydraulic pressure from said hydraulic actuator to thereby define a chain guide operating path wherein said derailleur housing acts as one bar of a 4-bar linkage, and three other bars of said 4-bar linkage are located within said derailleur housing; and a mounting block attached to a second end of said derailleur housing which moves along the chain guide operating path when said derailleur housing moves relative to said mounting shaft.

* * * * *